United States Patent
Eubanks et al.

(10) Patent No.: US 6,938,751 B1
(45) Date of Patent: Sep. 6, 2005

(54) VERTICAL LIFT ASSEMBLY

(75) Inventors: Ronald L. Eubanks, Erlanger, KY (US); David Norman Radford, Cincinnati, OH (US)

(73) Assignee: TKF, Inc., Cincinnati, OH (US)

( * ) Notice: Subject to any disclaimer, the term of this patent is extended or adjusted under 35 U.S.C. 154(b) by 0 days.

(21) Appl. No.: 10/709,241

(22) Filed: Apr. 23, 2004

(51) Int. Cl.$^7$ ............................................. B65G 47/46
(52) U.S. Cl. ................................. 198/370.1; 198/809
(58) Field of Search ............................ 198/370.1, 809, 198/457.03, 437

(56) References Cited

U.S. PATENT DOCUMENTS

| | | | |
|---|---|---|---|
| 3,104,004 A * | 9/1963 | Poel et al. ................... | 198/367 |
| 3,164,246 A * | 1/1965 | De Good ..................... | 198/809 |
| 3,545,600 A | 12/1970 | Rudlaff | |
| 3,618,418 A | 11/1971 | Chittenden | |
| 3,825,109 A | 7/1974 | Stockbridge | |
| 3,961,700 A | 6/1976 | Fleischauer | |
| 4,013,161 A | 3/1977 | Nelson | |
| 4,174,774 A | 11/1979 | Bourgeois | |
| 4,279,377 A | 7/1981 | Peeples et al. | |
| 4,294,347 A | 10/1981 | Furlette et al. | |
| 4,541,520 A * | 9/1985 | Greenlee, III ............ | 198/370.1 |
| 4,798,275 A | 1/1989 | Leemkuil et al. | |
| 4,926,999 A * | 5/1990 | Fauth et al. ................ | 198/358 |
| 4,962,841 A * | 10/1990 | Kloosterhouse ........ | 198/370.09 |
| 5,056,653 A | 10/1991 | Lancaster | |
| 5,062,188 A | 11/1991 | Jones et al. | |
| 5,088,596 A | 2/1992 | Agnoff | |
| 5,125,497 A * | 6/1992 | Sundermann ............. | 198/463.3 |
| 5,127,513 A | 7/1992 | Huber | |
| 5,165,516 A * | 11/1992 | Reed et al. ............... | 198/370.1 |
| 5,205,394 A * | 4/1993 | Zeuschner ............... | 198/370.1 |
| 5,348,140 A | 9/1994 | Clos | |
| 5,462,156 A | 10/1995 | Kobayashi et al. | |
| 5,609,236 A * | 3/1997 | Neukam ................... | 198/370.1 |
| 5,743,375 A * | 4/1998 | Shyr et al. ............... | 198/463.3 |
| 5,918,728 A | 7/1999 | Syverson | |
| 5,927,469 A * | 7/1999 | Dunifon et al. ........... | 198/456 |
| 6,005,211 A | 12/1999 | Huang et al. | |
| 6,216,847 B1 * | 4/2001 | Schmidt .................. | 198/463.3 |
| 6,223,880 B1 * | 5/2001 | Caspi et al. ............. | 198/346.2 |
| 6,264,422 B1 * | 7/2001 | Hennes et al. ........... | 414/792.7 |
| 6,360,869 B1 * | 3/2002 | Itoh et al. ................ | 198/370.1 |
| 6,464,064 B1 * | 10/2002 | Rieg et al. ............. | 198/370.09 |
| 6,554,122 B2 * | 4/2003 | Auno et al. ............. | 198/369.3 |
| 6,581,749 B2 * | 6/2003 | Wood et al. ........... | 198/370.09 |

(Continued)

FOREIGN PATENT DOCUMENTS

JP            57175624 A        10/1982

(Continued)

*Primary Examiner*—Douglas Hess
(74) *Attorney, Agent, or Firm*—Daniel F. Nesbitt; Hasse & Nesbitt LLC

(57) ABSTRACT

A vertical lift assembly for raising a plurality of diverting belts between rollers of a roller conveyor, to engage and raise an object from the surface of the conveyor, and to divert it to the side of the conveyor. The vertical lift assembly uses a plurality of hinges to join together a stationary frame, as a base, and a raisable plate on which sets the diverting belt assembly. The hinge is formed from a section of roller chain. A pair of hinges is disposed along each side of the stationary frame and raisable plate. The hinges provide tilt-free lift of the diverting belt assembly.

20 Claims, 5 Drawing Sheets

U.S. PATENT DOCUMENTS 6,644,459 B2 * 11/2003 van Leeuwen et al. .. 198/370.1

FOREIGN PATENT DOCUMENTS

| JP | 2231315 A2 | 9/1990 |
| --- | --- | --- |
| JP | 6262472 A2 | 9/1994 |
| JP | 7304513 A2 | 11/1995 |
| JP | 9183514 A2 | 7/1997 |
| JP | 9255153 A2 | 9/1997 |
| JP | 10148099 A2 | 6/1998 |
| JP | 11208821 A2 | 8/1999 |
| JP | 2002321822 A2 | 11/2002 |
| JP | 2002347905 A2 | 12/2002 |

* cited by examiner

VERTICAL LIFT ASSEMBLY

BACKGROUND OF INVENTION

This invention relates to a vertical lift assembly for use in raising an object, and particularly for use as a diverting assembly for a roller conveyor system.

With increasing automation of manufacturing and warehousing operations, conveyors are becoming ever more relied upon for high-speed, reliable transfer of goods. Often, continuous manufacturing processes turn out goods faster than subsequent processing and finishing stations can perform. In order to accommodate this mismatch, diverting conveyors are used, for example, to distribute the product from the output conveyor of a fast stage to a number of input conveyors of subsequent slower stages. In such applications the lateral transfer to slower conveyors can cause jams on the faster conveyor due to the longer time required to effect the lateral transfer relative to the transit time of the goods on the faster main conveyor. In addition, the need for faster, more facile diverting conveyors requires a self-contained unit that can be fitted to operate compatibly with existing conveyor installations. Typically, conventional diverting systems are built-in to the existing conveyors, and are usually not designed to be added as auxiliary or peripheral equipment.

Diverters of many types are well known to the conveyor art. A typical diverter provides a transfer mechanism, such as a group of transfer belts, which is recessed beneath a transfer surface of the main conveyor when diversion is not desired, and that is raisable above the surface of the main conveyor to engage objects when diversion is intended.

In some conventional diverters, wherein rollers or belts are raised above a conveying surface of a main conveyor, the transfer belts, or the belts used to power rollers if diverter rollers are involved, are stretched during the raising or lowering. This can cause stress to the belts, with an increased chance for failure. Further, it can create difficulties in controlling the rate of speed of the diverting rollers.

Many past devices have involved transfer belts or rollers that are mounted in a frame system in such a manner that when they are raised they are also tilted somewhat. That is, an end of the diverter on one lateral side of the conveyor is raised higher than the end at the other side of the main conveyor during diverter operation. This may be inefficient and may cause tilting of objects being diverted, which may be undesirable in certain instances. Generally, conventional devices have not satisfactorily solved the problem of having vertical lift with no substantial tilting and without stretching of the transfer belts or drive belts for diverter rollers.

In addition, conventional diverters may have a multitude of moving parts and may need to be manufactured to fine tolerances for operation, both of which will tend to increase the cost of such systems. Generally, it is desirable to produce a diverter system that is not only well adapted for nearly universal application but which is also relatively inexpensive to build and operate by comparison to most conventional systems. Further, it is preferable that such a system be constructed to permit relatively easy access for maintenance, be relatively free from problems of failure during use, and minimizes the tilting of the lateral transfer belts and maintains the diverting transfer surface in planar relation with the conveying surface during diversion.

SUMMARY OF INVENTION

The present invention relates to an improved vertical lift assembly for use with a conveyor, comprising: a stationary member; a raisable member mounted on the stationary member for vertical movement between a first recessed position and a second intercepting position; an intercepting means mounted on the raisable member; a lift means for selectively raising the raisable frame between the first and second positions; and at least three of a hinge for joining in planar relationship the raisable member to the stationary member, each hinge comprising a first stationary joint affixed to the stationary member, a second joint affixed to the raisable member, and an third joint intermediate between and in communication with both the first and second joints; wherein in the first position, an upper engagement surface of the intercepting means is in a recess position below a transfer surface of the conveyor and out of potential engagement an object on the conveyor transfer surface; and wherein in the second position, the upper engagement surface is in a raised position, above the transfer surface of the conveyor for selected engagement with the object on the transfer surface.

The invention also relates to an improved diverting conveyor unit for diverting objects from a conveyor. The diverting conveyor unit comprises a conveyor assembly comprising a support structure; a plurality of spaced rollers having an upper transfer surface, mounted in the support structure; a drive apparatus for driving the rollers; and a main direction control device for operating the drive apparatus. The diverting conveyor unit also comprises: a vertical lift diverter assembly comprising: a stationary member; a raisable member mounted on the stationary member for vertical movement between a first recessed position and a second diverting position; a powered diverter means mounted on the raisable member; a lift means for selectively raising the raisable frame between the first and second positions; and at least three of a hinge for joining in planar relationship the raisable member to the stationary member. Each hinge comprises a first stationary joint affixed to the stationary member, a second joint affixed to the raisable member, and an third joint intermediate between and in communication with both the first and second joints. In the first position, an upper engagement surface of the powered diverter means is recessed below the transfer surface of the conveyor and out of potential diverting engagement with an object on the conveyor transfer surface. In the second position, the upper engagement surface is raised above the transfer surface of the conveyor for selected diverting engagement with the object on the transfer surface.

The invention also relates to an improved vertical lift assembly for use with raising an object, comprising a stationary member; a raisable member mounted on the stationary member for vertical movement between a first position and a second position; a lift means for selectively raising the raisable frame between the first and second positions; and at least three of a hinge for joining in planar relationship the raisable member to the stationary member, each hinge comprising a first stationary joint affixed to the stationary member, a second joint affixed to the raisable member, and an third joint intermediate between and in communication with both the first joint and the second joint.

DETAILED DESCRIPTION

Figure 1:
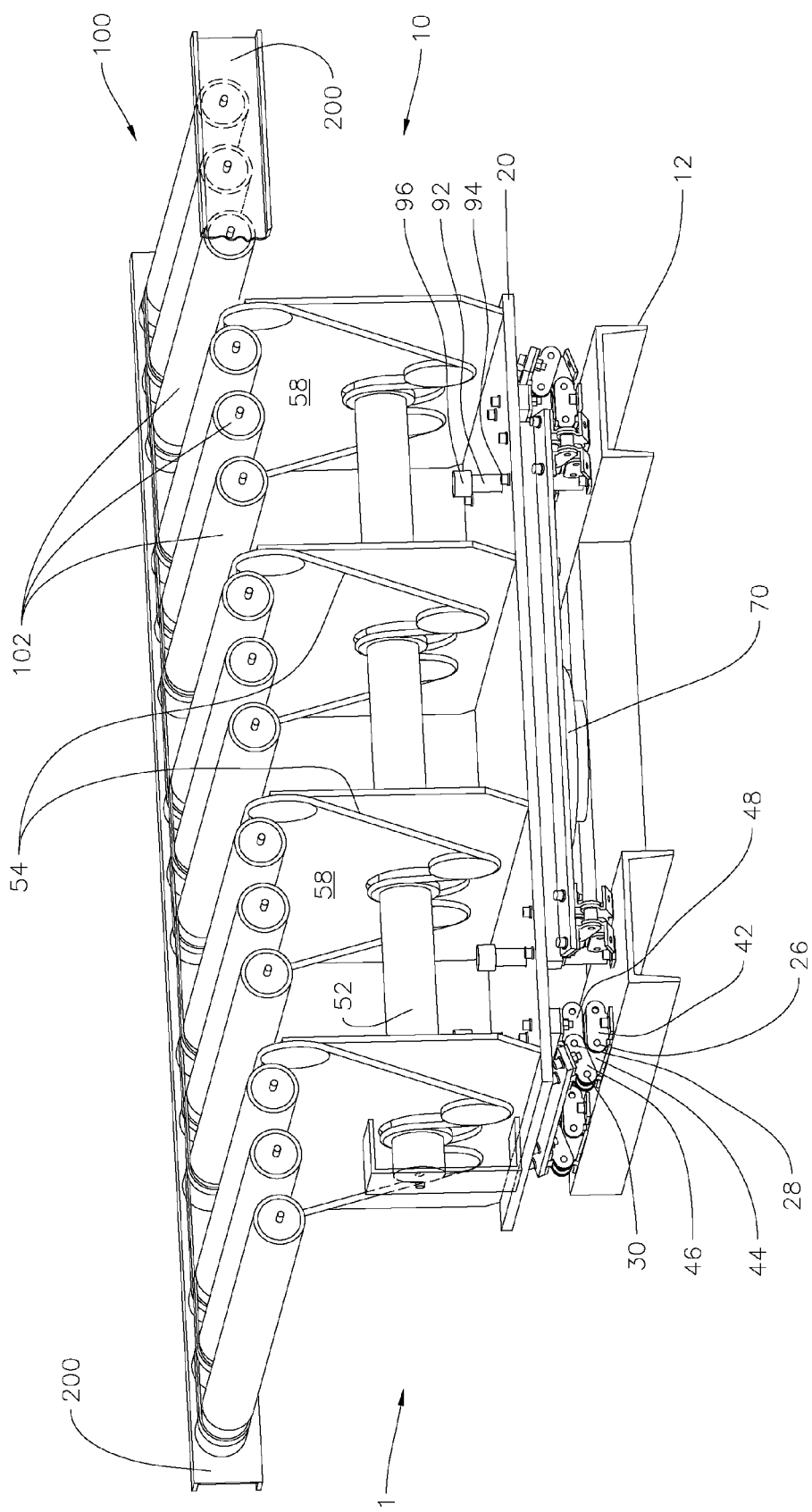
FIG. 1 shows a perspective view of a vertical lift assembly, used as a diverting conveyor unit for a conveyor, in a first or recessed position where the powered transfer loops can not engage an object resting upon the conveyor rollers.
Figure 2:
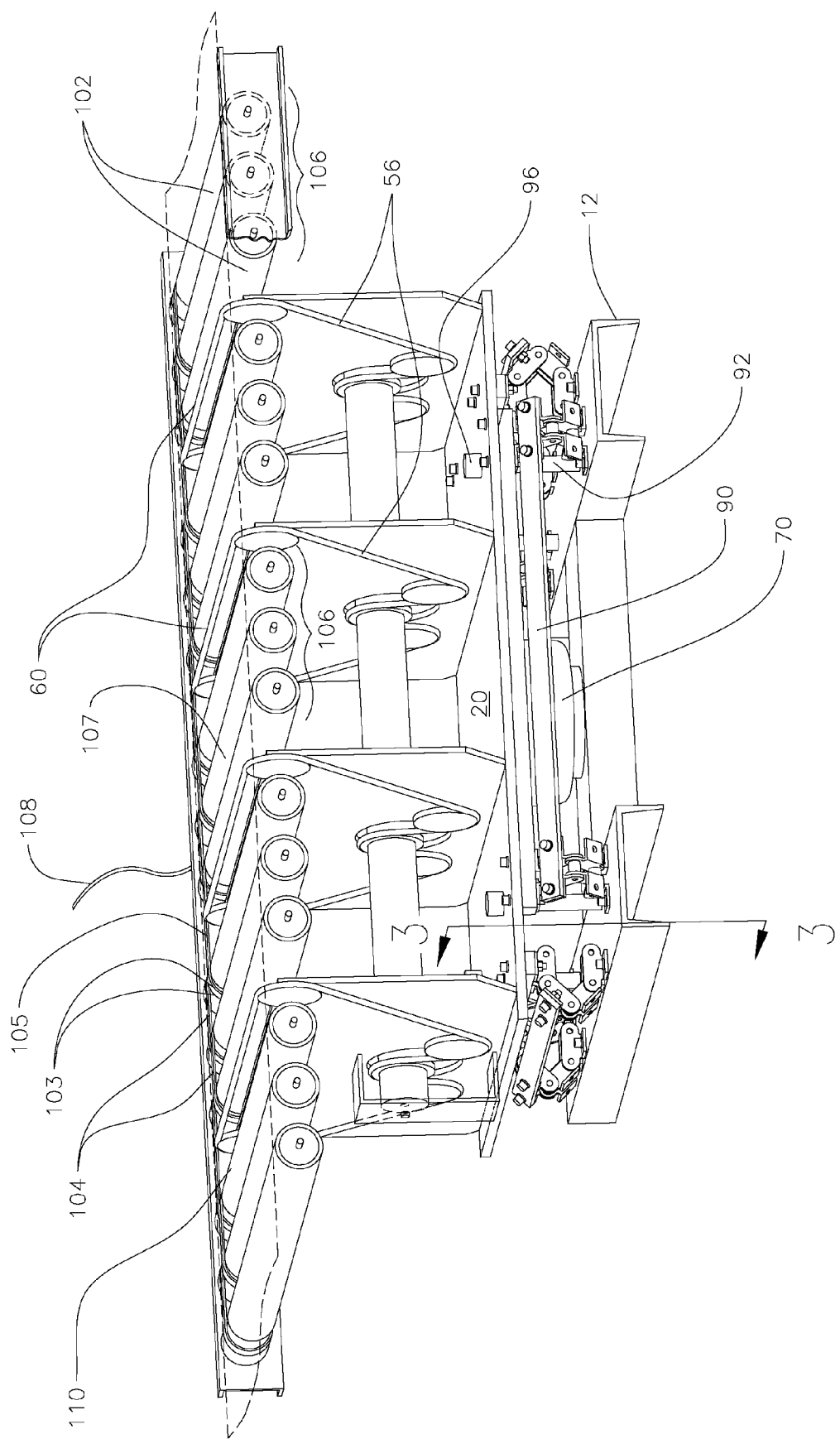
FIG. 2 shows a perspective view of the vertical lift assembly and diverting conveyor unit of FIG. 1 in a second or diverting position, where the powered transfer loops can engage with and divert an object resting upon the conveyor rollers.

FIGS. 1 and 2 show a portion of a roller conveyor system comprising an intercepting conveyor unit 1. The intercepting conveyor unit can be positioned along the roller conveying pathway. The unit serves to intercept an object passing along the conveyor, by either stopping the object, or by diverting the object off of the roller conveyor to a side of the roller conveyor. The intercepting conveyor unit can therefore be a stopping conveyor unit that comprises an object stop, or a diverting conveyor unit that comprises a diverting means, depending on the utility required. Examples of conventional diverting conveyors are those described in U.S. Pat. Nos. 4,174,774 and 4,798,275, hereby incorporated by reference.

The intercepting conveyor unit shown in the Figures is a diverting conveyor unit 1. The diverting conveyor unit 1 comprises a portion of a conveyor assembly 100 and a vertical lift diverter assembly 10. The conveyor assembly 100 comprises a support structure comprising the support frames 200, the plurality of spaced-apart rollers 102, a drive means 107 for driving the rollers, and a main direction control device (not shown) for operating the drive means. The upper-most surfaces of the plurality of rollers cooperate to form a planar upper transfer surface 110 on which the objects (not shown) are transported. The roller drive means is disposed inside of the support structure of a powered conveyor roller 107, shown in FIG. 2, as described in U.S. Pat. Nos. 5,088,596, 5,127,513, 5,462,156, and 5,918,728, all incorporated herein by reference.

The vertical lift diverter assembly 10 comprises a stationary member 12 and a raisable member 20 that is mounted on the stationary member 12 for vertical movement. The stationary member 12 is typically a base for a diverting means 50 comprising a plurality of transfer loops 54. The stationary member 12 is rigidly secured in fixed orientation relative to the support frames 200 of the roller conveyor. Generally, the stationary member 12 is formed from metal channels into a rectalinear frame having a planar configuration that is disposed parallel with the upper transfer surface 110 of the roller conveyor. The stationary member can be configured with other shapes to suit the layout and design of the conveyor unit.

The raisable member 20 is also typically formed from metal channels or a plate into a rectalinear (or other suitably) shape. The raisable member 20 is movably affixed and mounted to the stationary member 12 with a plurality of hinges 24 that have a first or collapse configuration shown in FIG. 1, and a second or extended configuration shown in FIG. 2. The hinges 24 constrain the movement of the raisable member 20 between a first or recessed position disposed proximate to the stationary member 12, and a second intercepting position disposed away from the stationary member 12, respectively. The hinges are shown positioned around the periphery of the stationary frame member 12, and together they join the raisable member 20 to the stationary member 12. At least three hinges 24 are used along the periphery, and typically at least one hinge is disposed along each of the sides of the frame. In the illustrated embodiment, hinges 24 are positioned proximate each end of each side of the frame and plate members, so that a pair of hinges 24 join the adjacent sides of the stationary frame 12 and the raisable plate 20.

Figure 3:
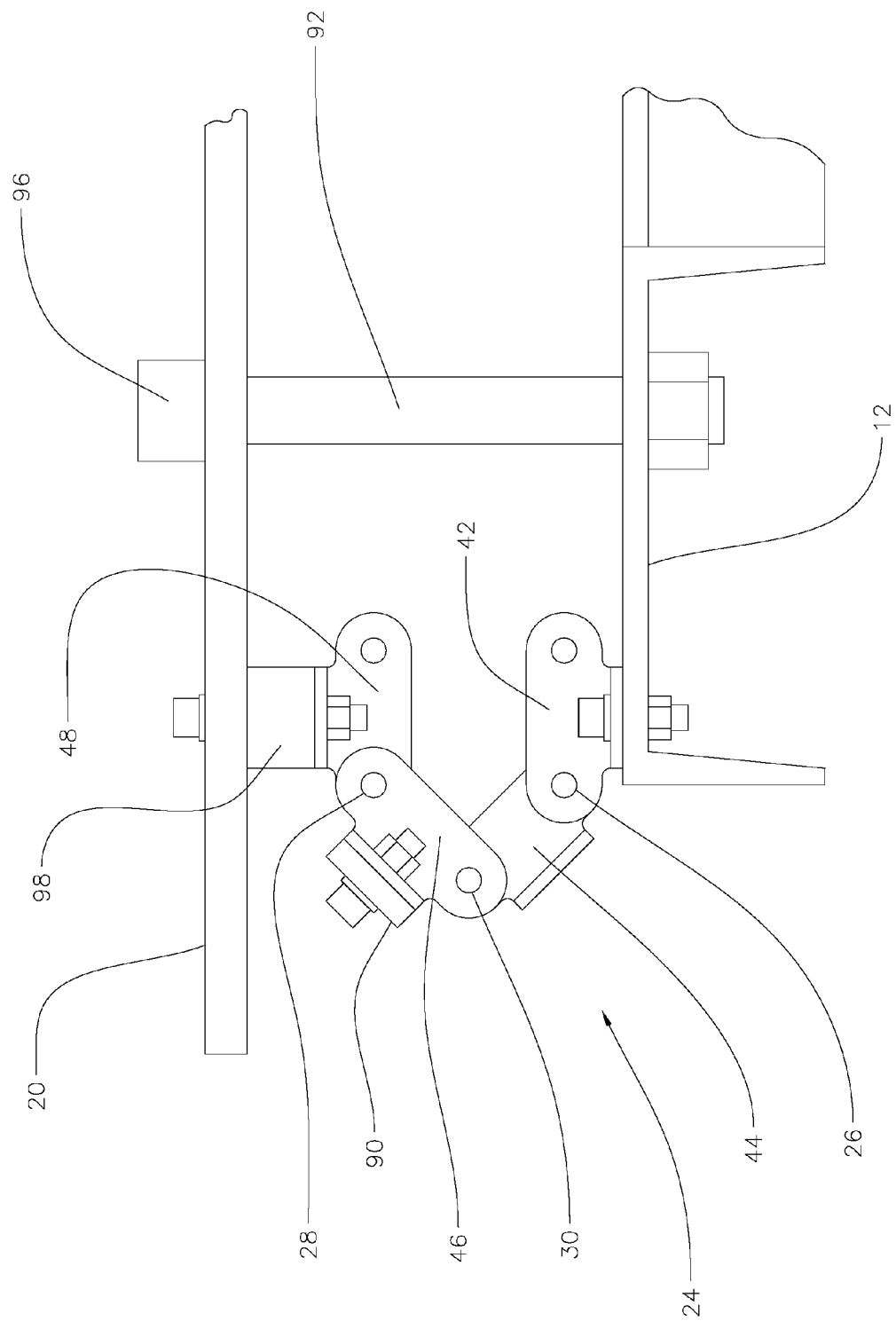
FIG. 3 shows a partial elevation view of a hinge of the vertical lift assembly, viewed from line 3—3 of FIG. 2.

As shown in FIG. 3, the hinge 24 of the present invention comprises three pivoting joints. In the illustrated embodiment, the hinge is formed from a section of a roller chain. The first joint 26 is formed between a bearing pin on a first link 42 that is rigidly affixed to the stationary frame 12, and a bushing on the first end of a second link 44. The second joint 28 is formed between a bushing on a fourth link 48 that is rigidly affixed to the raisable plate 20, and a bearing pin on the second end of a third link 46. The third joint 30 is formed between a bushing on the second end of the second link 44, and a bushing on the first end of the third link 46. The first joint 26 is fixed in position to the stationary frame 12, and the third joint is fixed in position to, and for movement with, the raisable plate 20. The third joint 30 is intermediate between the first joint 26 and the second joint 28, and is in communication with the first joint 26 and second joint 28 via the second link 44 and third link 46, respectively. The second link 44 and the third link 46 rotate about the third joint 30 in response to movement of the raisable plate 20 between its first and second positions in relation to the stationary frame 12.

In the illustrated embodiment, each hinge 24 is oriented whereby its operation, designated as the arc of rotation of the second link 44 and third link 46 about the third joint 30, is perpendicular to the side of the plate 20 to which it is affixed. This ensures that a horizontal force that is exerted upon the raisable plate 20 in the lateral, longitudinal, or any angular direction, is adequately resisted by the hinge oriented in the same direction, thereby resisting or preventing tilting of the raisable plate 20. Connecting adjacent hinges 24 with a support bracket 90 can further stabilize the hinges and raisable plate 20. This orientation of the hinges allows the raisable frame 20 to resist tilting, relative to the stationary frame 12, and helps to ensure that the raisable frame remains in parallel planar relation with the upper transfer surface 110 of the conveyor 100. A spacer 98 is provided between the raisable plate 20 and the hinge 24 to prevent the hinge 24 and the support bracket 90 from contacting the bottom surface of the raisable plate 20. This can enable the hinge 24 to be positioned inboard the outer edge of the raisable plate 20 for personnel safety.

In general, it is preferred to position the plurality of hinges at or near the periphery of the stationary and raisable members, and away from (and preferably concentrically outward from) the center of gravity of the vertical lift diverter assembly. This also minimizes tilting of the raisable plate 20 relative to the stationary frame 12 and the upper transfer surface 110 of the conveyor 100.

Additionally, one or more stroke limiters 92 can be disposed as a stroke stopping means for stopping the upward movement or stroke of the raisable plate 20, relative to the stationary frame 12. In the illustrated embodiment, the stroke limiter extends upward from the stationary frame 12 through a guide hole 94 in the raisable plate 20. Each stroke limiter 92 comprises a stroke stop 96 at its distal end, which is positioned to engage the upper surface of the raisable plate 20 proximate the guide hole 94 when the raisable plate 20 arrives at its second or diverting position. Without the stroke stop 96, or an alternative stopping means, to control the movement of the raisable plate 20 away from the stationary frame 12, each hinge could expand or extend beyond its second configuration (shown in FIGS. 2 and 3) to an over-extended configuration. Movement of the raisable frame that is unrestrained by the stroke stops 96 would ultimately be stopped when the hinge 24 expanded toward a fully extended orientation, where with the intermediate third joint 30, the first stationary joint 26 and the second joint 28 align linearly. In a fully or an approximately fully extended orientation, the hinge can lock in place, or can require a significant downward load in the vertical direction (that is, along a line passing through the first stationary joint 26 and the second joint 28) before collapsing back to the first or collapsed configurations. During operation, the movement of the raisable plate 20 should avoid operating the hinges 24 into an extended configuration. Preferably, the hinges 24 and the stroke stop 96 are configured to only allow the second and third links of the hinges 24 to move to about 45 degrees, or less, relative to the plane of the stationary plate 20, when expanded to its second or extended configuration.

In an alternative embodiment, a hinge 24 can be positioned proximate to each corner of the stationary and raisable members, and preferably oriented to operate at an angle to each adjacent side. This provides that each corner-mounted hinge 24 can resist horizontal motion of the raisable plate 20 in both the lateral and longitudinal directions.

In the illustrated embodiment, the raisable plate or member 20 forms a base upon which is disposed the diverting means 50. The diverting means consists of four powered transfer loops 54 that are disposed between adjacent groups 106 of spaced-apart rollers 102. Each powered transfer loop 54 is driven through a plurality of pulleys and sprockets supported from a vertical support wall 58. A common drive shaft 52 drives and synchronizes the plurality of transfer loops 54. The illustrated common drive shaft 52 comprises a powered conveyor roller, as described herein before. Alternatively, the common drive shaft can be driven through a chain and sprockets by a power means, such as a geared motor, which can be co-mounted onto the base of the raisable member 20.

As shown in FIG. 2, each transfer loop 54 comprises a linear diverting portion 56 that extends substantially parallel with the upper transfer surface 110 of the rollers 102 and is oriented in the transverse direction. Each diverting portion 56 of the transfer loop 54 provides an upper engagement surface 60 that engages an object moving along the conveyor when the raisable member 20 is in its second or diverting position, and the upper engagement surface 60 has been raised above the transfer surface 110 of the conveyor. Then the raisable member 20 is in its first or recessed position, the upper engagement surface 60 is recessed between the rollers 102 and below the transfer surface 110 of the conveyor, and out of potential engagement with objects on the conveyor transfer surface 110.

The transfer loop 54 is typically a narrow member that can fit between the groups of spaced rollers, allowing for minimum spacing between the rollers for the accommodation of even the smallest object to be conveyed. The transfer loop 54 can comprise a roller chain or a friction belt, which engages the sprocket of a drive system for continuously driving the transfer loop 54. A transverse direction power and control device operates the drive shaft 52 and the associated sprockets continuously at high speed, and can switch lateral diverting direction from left feed to right feed, and vice versa, extremely quickly.

When the diverting conveyor unit is operated with the vertical lift diverter assembly in the recessed position, as shown in FIG. 1, objects can be conveyed onto and through the diverting conveyor unit. When the diverting conveyor unit is operated with the vertical lift diverter assembly in the diverting position, as shown in FIG. 2, objects can be diverted from the conveyor unit to an adjacent, lateral conveyor or workstation (not shown). The transfer loops 54 extend generally parallel to one another and transverse to the longitudinal path of the conveyor 100. Generally, during diversion, all of the transfer loops 54 are operated at a constant and equivalent rate of speed to move their upper surfaces 60 in the general direction of diversion. It will be understood that a selected spacing between the adjacent transfer loops 54 will accommodate engaging and lifting objects of various size that move along the conveyor 100. Thus, a wide variety of transfer loop and roller spacing can be used.

Figure 4:
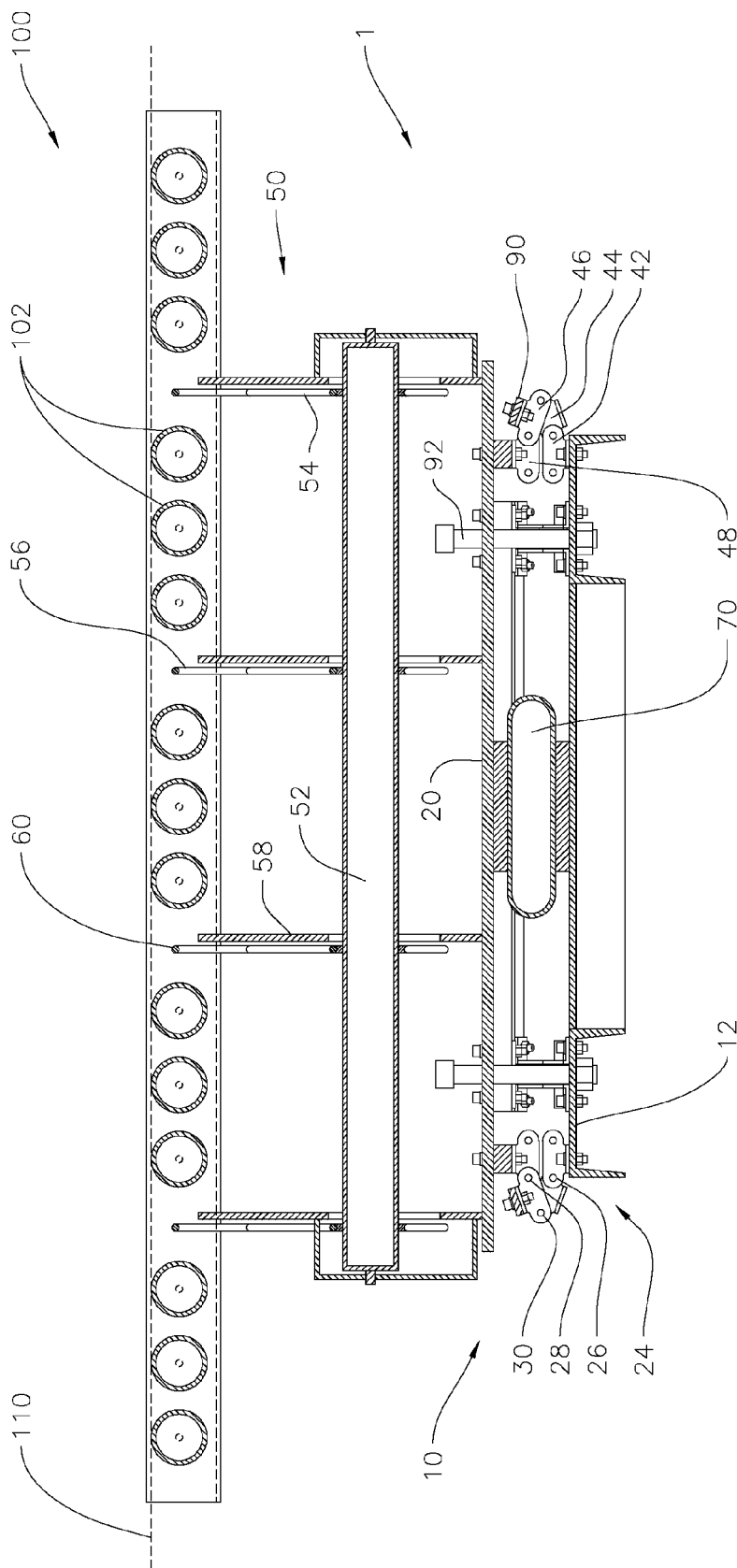
FIG. 4 shows a cross sectional elevation view of the diverting conveyor unit of FIG. 1, taken through the center of the drive shaft 52.
Figure 5:
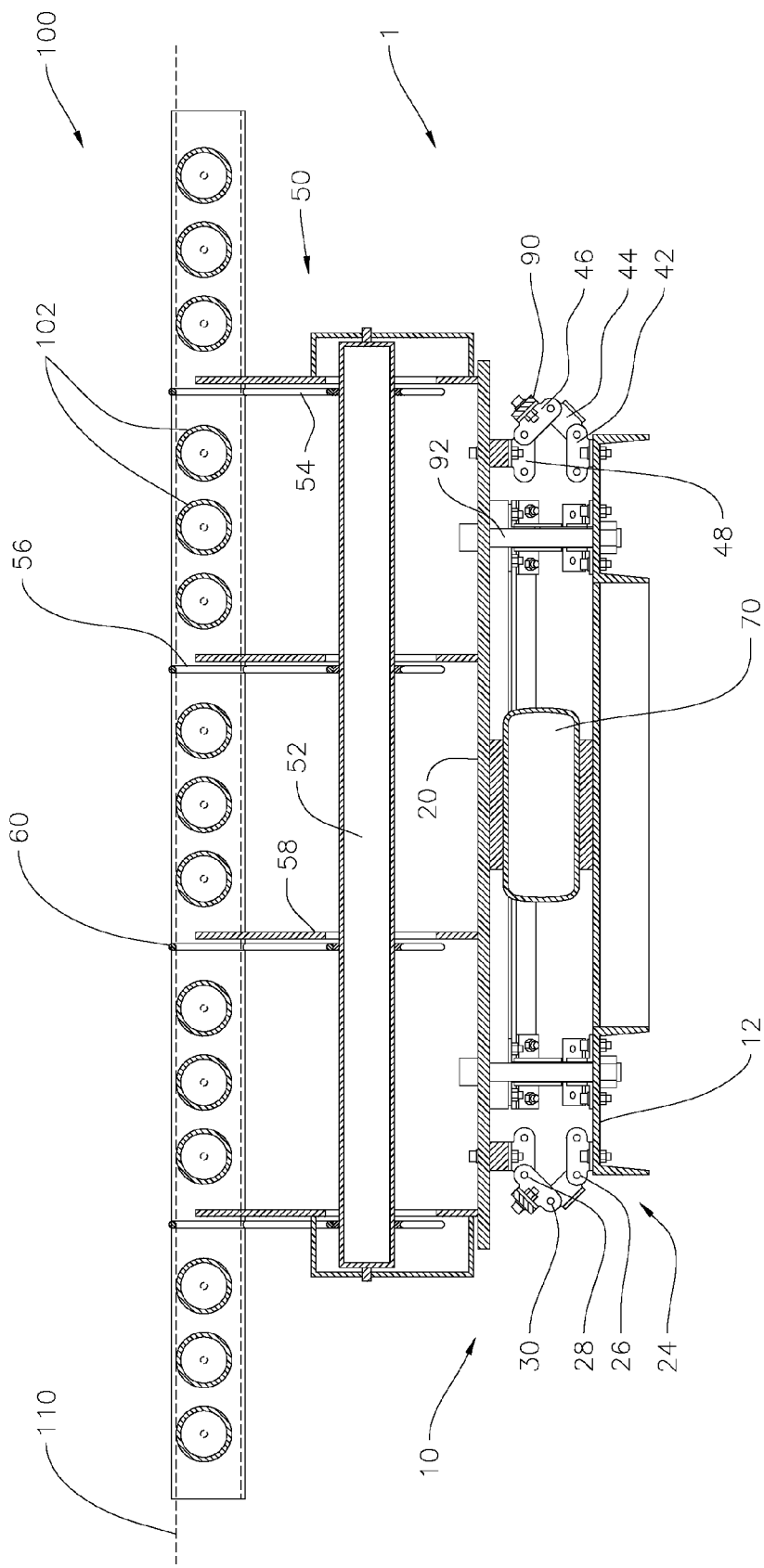
FIG. 5 shows a cross sectional elevation view of the diverting conveyor unit of FIG. 4 with the vertical lift assembly in the second position.

The raising and lowering of the raisable member 20 can be affected by a lift means, and typically by either a hydraulic or a pneumatic means. The lift means can comprise a cylinder or a bladder. FIGS. 4 and 5 show the lift means as a pneumatic bladder lift 70. A pressure regulator (not shown) can be used to regulate the amount of pressure within the bladder, to raise and lower the raisable member 20, and to control the extent or distance of the lift. A suitable bladder or bag lift is a model W01-358-7484, available from Firestone, of Akron, Ohio. Other suitable lift means include electro-mechanical hoists or jacks, electrical solenoids, and pneumatic or hydraulic piston and cylinder arrangements.

To assist the return of the raisable member 20 from its extended position, a biasing means such as a spring can be provided. For example, the spring can be disposed over a stroke limiter 92 and retained between the stroke stop 96 and the base of the raisable member 20, to assist in forcing the raisable member 20 back to the first position when the lifting force of the lift means 70 is removed or reduced.

A typical conveyor system that can employ the present invention is a conveyor roller system, such as described in U.S. Pat. Nos. 3,618,418, 3,961,700, 4,013,161, 4,279,377, 5,056,653, and 5,348,140, incorporated herein by reference. These conveyors typically consist of a series of transverse, parallel, closely-spaced driven rollers that convey an object longitudinally along an upper transfer surface of the rollers. Typically, the spacing between adjacent rollers is minimized to accommodate objects of smaller size. Typically a series or group of rollers is commonly powered for rotational conveying of the object.

One preferred roller conveyor system shown in FIG. 2 utilizes rollers 102. The rollers 102 can be configured into a group of rollers 106 that between which the powered transfer loops 54 re positioned. Each roller 102 has a pair of side-by-side radial grooves 103 formed into the roller surface near at least one end or intermediate the ends. The radial grooves 103 are configured to receive a plurality of O-ring type drive belts 104. A shorter drive belt 106 is used to loop between one roller 102 and an adjacent roller 102 in the same group 106. A longer drive belt 105 is used to loop between the end rollers of adjacent groups 106. The looping of the belts 104 and 105 within the respective grooves enables relative rotation of the adjacent rollers 102. The rollers 102 extend between and are axially connected to a pair of parallel, longitudinally-oriented frame members 200. that the plurality of rollers are driven by a common drive means that is coupled to at least one of the rollers for transmitting power to effect rotation of the rollers. In the illustrated embodiment, the common drive means is a powered master roller 107 that is electrically powered via a conduit 108 to provide the rotational power to drive rotation of the adjacent rollers within its group and in adjacent groups. The common drive means can also be a separately disposed powered drive shaft that drives the master roller 108. The conveyor can be configured to drive the rollers in the forward or reverse direction, to move an object longitudinally along the conveyor rollers.

In an alternative conveyor assembly, the rollers can have a plurality of integrally-formed, radially-disposed, recessed splines that are formed into the surface of the roller, which are driven with a drive belt having corresponding raised ribs to mechanically engage the recessed splines, as described in U.S. Pat. No. 5,348,140, issued to Clos on Sep. 20, 1994, and incorporated herein by reference. This configuration can provide a more positive drive force for rotation of the adjacent slave rollers.

In an alternative embodiment, the roller drive apparatus can consist of a drive motor having an integral or associated transmission, and a drive chain with associated sprockets. In operation, an object passing along the conveyor is intercepted and diverted from the conveyor at the diverting conveyor unit. As the object arrives from along the conveyor 100 onto the diverting conveyor unit 1, an optical sensor can be used to recognize that the object is positioned on or adjacent the conveyor unit, and a controller can cut power to the group of rollers 102 associated with the diverting conveyor unit 1. The lift means 70 is actuated to raise the raisable frame 20, which raises the upper engagement surface 60 of the powered transfers loops 54 into engagement with the object, and essentially lifts the object up and off of the upper transfer surface 110 of the conveying rollers 102. The controller powers the powered transfer loops 54 to move the object laterally off of the diverting conveyor unit and onto an adjacent secondary conveyor or other workstation. The powered transfer loops 54 can be run continuously to be constantly ready to immediately divert the object when the raisable frame 20 is raised to its diverting position.

The improved vertical lift assembly can also be used to lift any object vertically between a first and second position. This unit is particularly advantageous in use where the object to be lifted vertically is very heavy, and where the operation requires minimal or no tilting of the object during the vertical lifting.

What is claimed is:

1. An improved vertical lift assembly for use with a conveyor, comprising:
    a stationary member;
    a raisable member mounted on the stationary member for vertical movement between a first recessed position and a second intercepting position;
    an intercepting means mounted on the raisable member;
    a lift means for selectively raising the raisable member between the first and second positions; and
    at least three of a hinge for joining in planar relationship the raisable member to the stationary member, each hinge comprising a first stationary joint affixed to the stationary member, a second joint affixed to the raisable member and a third joint intermediate between and in communication with both the first joint and the second joint;
    wherein in the first position, an upper engagement surface of the intercepting means is in a recessed position below a transfer surface of a conveyor and out of potential engagement with an object on the conveyor transfer surface; and wherein in the second position, the upper engagement surface is in a raised position, above the transfer surface of the conveyor for selected engagement with the object on the transfer surface.

2. The vertical lift assembly according to claim 1 wherein the hinges prevent tilting of the raisable member relative to the stationary member.

3. The vertical lift assembly according to claim 1 wherein the hinge comprises a roller chain.

4. The vertical lift assembly according to claim 3 wherein each of the stationary member and the raisable member have a rectangular planar shape, and at least one hinge is positioned proximate a side of the members.

5. The vertical lift assembly according to claim 4 wherein a hinge is positioned proximate each end of the sides of the members.

6. The vertical lift assembly according to claim 4 wherein the two hinges at either end of the side are joined together with a support bracket.

7. The vertical lift assembly according to claim 4 wherein the hinges are positioned at each corner of the members, and operate at an angle to each adjacent side of the members.

8. The vertical lift assembly according to claim 1 wherein the lift means comprises a hydraulic or pneumatic cylinder.

9. The vertical lift assembly according to claim 8 wherein the assembly further comprises a stopping means for controlling the movement of the raisable member away from the stationary member.

10. The vertical lift assembly according to claim 1 wherein the intercepting means is selected from a stop means, and a powered diverter means comprising a plurality of powered transfer loops that are disposed between pairs of adjacent, spaced rollers of the conveyor.

11. The vertical lift assembly according to claim 1 wherein the lift means is associated with the raisable member.

12. An improved diverting conveyor unit for diverting objects from a conveyor assembly, the diverting conveyor unit comprising:
    a conveyor assembly comprising:
        a support structure
        a plurality of spaced rollers having an upper transfer surface, mounted in the support structure;
        a drive apparatus for driving the rollers; and
        a main direction control device for operating the drive apparatus;
    a vertical lift diverter assembly comprising:
        a stationary member;
        a raisable member mounted on the stationary member for vertical movement between a first recessed position and a second diverting position;
        a powered diverter means mounted on the raisable member;
        a lift, means for selectively raising the raisable member between the first and second positions; and
        at least three of a hinge for joining in planar relationship the raisable member to the stationary member, each hinge comprising a first stationary joint affixed to the stationary member, a second joint affixed to the raisable member, and a third joint intermediate between and in communication with both the first joint and the second joint;
    wherein in the first position, an upper engagement surface of the powered diverter means is recessed below the transfer surface of the conveyor and out of potential diverting engagement with an object on the conveyor transfer surface; and wherein in the second position, the upper engagement surface is raised above the transfer surface of the conveyor for selected diverting engagement with the object on the transfer surface.

13. The diverting conveyor unit according to claim 12 wherein the hinges prevent tilting of the raisable member relative to the stationary member.

14. The diverting conveyor unit according to claim 12 wherein the hinge comprises a roller chain.

15. The diverting conveyor unit according to claim 12 wherein each of the stationary member and the raisable member have a rectangular planar shape, and at least one hinge is positioned proximate each end of the sides of the members.

16. The diverting conveyor unit according to claim 15 wherein the two hinges at either end of the side are joined together with a support bracket.

17. The diverting conveyor unit according to claim 15 wherein the hinges are positioned at each corner of the members, and operate at an angle to each adjacent side of the members.

18. The diverting conveyor unit according to claim 12 wherein the lift means comprises a hydraulic or pneumatic cylinder.

19. The diverting conveyor unit according to claim 18 wherein the assembly further comprises a stopping means for controlling the movement of the raisable member away from the stationary member.

20. The diverting conveyor unit according to claim 12 wherein the powered diverter means comprises a plurality of powered transfer loops that are disposed between pairs of adjacent, spaced rollers.

* * * * *